US008487041B2

(12) United States Patent
Szkudlarek et al.

(10) Patent No.: US 8,487,041 B2
(45) Date of Patent: *Jul. 16, 2013

(54) UNSATURATED POLYESTER

(75) Inventors: Marian Henryk Szkudlarek, Nordhorn (DE); Johan Franz Gradus Antonius Jansen, Geleen (NL); Stefanus Jacobus Duyvestijn, Deventer (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/255,148

(22) PCT Filed: Mar. 24, 2010

(86) PCT No.: PCT/EP2010/053849
§ 371 (c)(1),
(2), (4) Date: Feb. 6, 2012

(87) PCT Pub. No.: WO2010/108964
PCT Pub. Date: Sep. 30, 2010

(65) Prior Publication Data
US 2012/0136117 A1    May 31, 2012

(30) Foreign Application Priority Data

Mar. 25, 2009 (EP) .................................. 09156130
Mar. 25, 2009 (EP) .................................. 09156131
Mar. 25, 2009 (EP) .................................. 09156137
Mar. 25, 2009 (EP) .................................. 09156139
Mar. 25, 2009 (EP) .................................. 09156142

(51) Int. Cl.
| C08L 67/06 | (2006.01) |
| C08G 63/16 | (2006.01) |
| C08G 63/52 | (2006.01) |
| C08G 63/676 | (2006.01) |
| C08G 63/66 | (2006.01) |
| C08G 63/91 | (2006.01) |

(52) U.S. Cl.
USPC ........... 524/604; 528/272; 528/298; 528/303; 528/306; 525/451; 525/445; 525/27; 525/35; 525/36

(58) Field of Classification Search
USPC ... 524/604; 528/272, 298, 303, 306; 525/451, 525/445, 27, 35, 36
See application file for complete search history.

(56) References Cited

U.S. PATENT DOCUMENTS

| 3,953,403 | A | 4/1976 | Fujiyoshi et al. |
| 5,408,013 | A | 4/1995 | Kawakami et al. |
| 6,608,167 | B1 * | 8/2003 | Hayes et al. .................. 528/271 |
| 2003/0204029 | A1 * | 10/2003 | Brandenburg et al. ........ 525/444 |
| 2006/0240352 | A1 * | 10/2006 | Ogawa et al. ............... 430/109.3 |
| 2010/0239969 | A1 * | 9/2010 | Owada et al. ............... 430/108.2 |
| 2011/0040004 | A1 * | 2/2011 | Andjelkovic et al. ......... 524/394 |

FOREIGN PATENT DOCUMENTS

| GB | 1 012 563 | 12/1965 |
| WO | WO 2008/031592 | 3/2008 |

OTHER PUBLICATIONS

International Search Report for PCT/EP2010/053849, mailed Jun. 2, 2010.
Van Haveren et al., "Resins and additives for powder coatings and alkyd paints, based on renewable resources", *Journal of Coatings Technology Research*, vol. 4, No. 2, Jun. 2007, pp. 177-186.

* cited by examiner

*Primary Examiner* — Michael Pepitone
(74) *Attorney, Agent, or Firm* — Nixon & Vanderhye P.C.

(57) ABSTRACT

The present invention relates to a resin composition comprising (a) an unsaturated polyester resin having a molecular weight $M_n$ of at least 750 Dalton and at most 5000 Dalton and (b) a reactive diluent, wherein the unsaturated polyester resin comprises C5-C10 unsaturated diacid building blocks and isosorbide building blocks. Preferably, at least part of the isosorbide is derived from a non-fossil source. Preferably, itaconic acid or anhydride is used as the C5 unsaturated dicarboxylic acid.

13 Claims, No Drawings

UNSATURATED POLYESTER

This application is the U.S. national phase of International Application No. PCT/EP2010/053849 filed 24 Mar. 2010 which designated the U.S. and claims priority to EP Patent Application Nos. 09156130.8 filed 25 Mar. 2009, 09156131.6 filed 25 Mar. 2009, 09156137.3 filed 25 Mar. 2009, 09156139.9 filed 25 Mar. 2009 and 09156142.3 filed 25 Mar. 2009, the entire contents of each of which are hereby incorporated by reference.

The present invention relates to resin compositions, suitable to be used in the manufacturing of structural parts, comprising (a) an unsaturated polyester resin with a molecular weight $M_n$ of at least 750 Dalton and at most 5000 Dalton and (b) reactive diluent.

Unsaturated polyester resins are well known to be suitable for many construction purposes, however in view of handling properties of the resin composition, it is desired that the viscosity of the resin composition is not too high. For example relining encompasses impregnating of fiber with resin composition. Therefore, viscosity of the resin composition may not be too high in view of handling and time for impregnation. This fact that viscosity is very important also holds for many other applications such as chemical anchoring, injection, vacuum injection but also the simple laminating processes like open mould applications run much smoother with lower viscosity resins. Consequently there is a large need for methods to reduce the viscosity of the resin composition without affecting the properties of the cured resin, especially the thermal stability as indicated by the HDT in a negative way. One way to lower the viscosity is adding more reactive diluent, however, due to the lower content of resin in the resin composition, this results generally in deterioration of the mechanical properties of the cured resin composition and this may result in a decline of the thermal stability and can therefore not generally be applied.

Furthermore in view of the ecological footprint, there is a high desire to make unsaturated polyesters, which can be used for manufacturing of structural parts, which comprise bio-based building blocks.

The use of petroleum based monomers in the manufacture of consumer products is expected to decline in the coming years because of the continuous rise in the price of oil and the high rate of depletion of known oil reserves. This, in connection with strict government regulations all around the world on environmental protection against pollution, has inspired the investigation of renewable resources as a possible alternative to petroleum based monomers. With the diminishing of the limited petroleum resources, use of renewable resources as chemicals for industrial applications is of great interest. A very suitable example of a biobased building block for unsaturated polyesters is isosorbide as it can be obtained for instance from corn.

However it has been found that using isosorbide in combination with maleic anhydride results in a strong increase viscosity of the diluted resin although with an expected increase in HDT.

The object of the present invention is obtaining a resin composition with a relatively low viscosity, while the thermal stability of the cured objects (as expressed in the HDT) is maintained or even increased.

The inventors have surprisingly found that this objective can be achieved with unsaturated polyester resin comprising isosorbide and C5-C10 unsaturated diacid building block. In a preferred embodiment of the invention itaconic acid or anhydride is used for the C5-C10 unsaturated diacid building blocks. This is especially preferred as itaconic acid or anhydride can be derived from non-fossil source such as for example corn.

The fact that the HDT increases is the more surprising as a resin prepared from itaconic acid and 1,2-propyleneglycol resulted in a cured object with a lower thermal stability although with an expected slight decrease of viscosity.

In a preferred embodiment of the invention, at least part of the isosorbide and/or at least part of the itaconic acid or itaconic anhydride that is preferably used to obtain the unsaturated polyester present in the resin composition according to the invention is derived from a non-fossil source. In a more preferred embodiment of the invention, at least part of the isosorbide and at least part of the itaconic acid or itaconic anhydride that is used to obtain the unsaturated polyester present in the resin composition according to the invention is derived from a non-fossil source.

The unsaturated polyester present in the resin composition according to the invention comprises isosorbide and C5-C10 unsaturated dicarboxylic acid building blocks. The molecular weight (Mn) is determined in tetrahydrofurane using GPC according to ISO 13885-1 employing polystyrene standards and appropriate columns designed for the determination of the molecular weights.

The unsaturated polyester present in the resin composition according to the invention can be manufactured by polycondensation of at least isosorbide as polyol and at least C5-C10 unsaturated dicarboxylic acid as unsaturated dicarboxylic acid. The polycondensation may also be effected in the presence of other dicarboxylic acids containing reactive unsaturations, such as for example maleic acid or anhydride and fumaric acid and/or in the presence of saturated aliphatic dicarboxylic acids or anhydrides, like for example oxalic acid, succinic acid, adipic acid, sebacic acid and/or in the presence of aromatic saturated dicarboxylic acids or anhydrides like for example phthalic acid or anhydride and isophthalic acid. In the polymerisation a further di- or polyfunctional alcohol may be used. Preferably, a diol is used such as for example 1,2-propylene glycol, ethylene glycol, diethylene glycol, triethylene glycol, 1,3-propylene glycol, dipropylene glycol, tripropylene glycol, neopentyl glycol, hydrogenated bisphenol-A. or ethoxylated/propoxylated bisphenol A.

According to a preferred embodiment the molecular weight of the diol in the unsaturated polyester resin is in the range from 60 to 250 Dalton.

In the unsaturated polyester resin present in the resin composition according to the invention, the molar amount of isosorbide is preferably at least 2.5%, more preferably at least 5% and even more preferably at least 7.5% (relative to the total amount of diols). The molar amount of isosorbide is preferably at most 50%, more preferably at most 40% and even more preferably at most 30% (relative to the total amount of diols). In a preferred embodiment, the molar amount of isosorbide in the unsaturated polyester resin is at least 2.5% and at most 50% (relative to the total amount of diols).

In the unsaturated polyester resin present in the resin composition according to the invention, preferably at least 25 wt. % of the dicarboxylic acid building blocks are itaconic acid building blocks. More preferably, at least 55 wt. % of the dicarboxylic acid building blocks in the unsaturated polyester present in the resin composition according to the invention are itaconic acid building blocks.

Preferably at least 25 wt. %, more preferably at least 55 wt. %, of the unsaturated dicarboxylic acid building blocks are itaconic acid building blocks.

The acid value of the unsaturated polyester resin present in the resin composition according to the invention is preferably in the range from 25 to 125 mg KOH/g resin, more preferably in the range from 30 to 100 mg KOH/g resin, more preferably in the range from 35 to 75 mg KOH/g resin. As used herein, the acid value of the resin is determined titrimetrically according to ISO 2114-2000.

The molar ratio of hydroxyl end groups and carboxylic acid end groups in the unsaturated polyester resin present in the resin composition according to the invention is preferably in the range from 0.33 to 3, more preferably in the range from 0.33 to 0.9, more preferably in the range from 1.1 to 3. The molar ratio of hydroxyl end groups and carboxylic acid end groups in the unsaturated polyester resin is calculated by dividing the hydroxyl value by the acid value.

The hydroxyl value of the unsaturated polyester resin present in the resin composition according to the invention is preferably higher than 25 mg KOH/g resin and more preferably higher than 40 mg KOH/g resin. As used herein, the hydroxyl value of the polyester is determined according to ISO 4629-1996.

The glass transition temperature $T_g$ of the unsaturated polyester is preferably at least −70° C. and at most 100° C. In case the unsaturated polyester is applied for construction purposes, the glass transition temperature $T_g$ of the unsaturated polyester resin present in the resin composition according to the invention is preferably at least −70° C., more preferably at least −50° C. and even more preferably at least −30° C. The $T_g$ of the unsaturated polyester resin present in the resin composition according to the invention is preferably at most 70° C., more preferably at most 50° C. and even more preferably at most 30° C. As used herein, the $T_g$ is determined by means of DSC (heating rate 5° C./min).

The unsaturated polyester resin present in the resin composition according to the invention can be advantageously prepared in the presence of at least one radical inhibitor selected from copper carboxylate, benzoquinone, alkyl substituted benzoquinone, hydroquinone and/or a methyl substituted hydroquinone. In a preferred embodiment, the unsaturated polyester present in the resin composition according to the invention is prepared by (i) charging the reactor with C5-C10 dicarboxylic acid an/or anhydride and optionally other diacids, isosorbide and optionally other diols, and at least one radical inhibitor selected from copper carboxylate, benzoquinone, alkyl substituted benzoquinone, hydroquinone and/or a methylated hydroquinone,
  (ii) heating the reactor till a temperature from 180 to 200° C. until the acid value of the formed unsaturated polyester is below 60,
  (iii) cooling the formed resin, preferably to a temperature of from 20 to 120° C., and
  (iv) optionally diluting the resin with reactive diluent.

Preferably, the unsaturated polyester resin present in the resin composition according to the invention is prepared in the presence of hydroquinone, 2-methylhydroquinone, benzoquinone or 2-methylbenzoquinone as inhibitor, more preferably in the presence of 2-methylhydroquinone as inhibitor and even more preferably, in the presence of hydroquinone and 2-methylhydroquinone as inhibitor.

In one embodiment, the resin composition according to the invention resin can be applied as a powder coating composition. The preparation of powder coating compositions is described by Misev in "Powder Coatings, Chemistry and Technology" (pp. 224-300; 1991, John Wiley) hereby incorporated by reference. Therefore the present invention also relates to a powder coating composition comprising an unsaturated polyester comprising isosorbide building blocks and C5-C10 unsaturated dicarboxylic acid building blocks. In case the unsaturated polyester according to the invention is applied in a powder coating composition, the glass transition temperature $T_g$ of the unsaturated polyester resin is preferably at least 20° C., more preferably at least 25° C. and even more preferably at least 30° C. and at most 100° C., more preferably at most 80° C. and even more preferably at most 60° C.

A common way to prepare a powder coating composition is to mix the separately weight-out components in a premixer, heat the obtained premix, for example in a kneader, preferably in an extruder to obtain an extrudate, cool down the obtained extrudate until it solidifies and crush it into granules or flakes that are further grinded to reduce the particle size followed by appropriate classification to obtain a powder coating composition of the right particle size. Therefore, the invention also relates to a process for the preparation of a powder coating composition according to the invention comprising the steps of:
  a. mixing the components of the powder coating composition to obtain a premix,
  b. heating the obtained premix, preferably in an extruder, to obtain an extrudate,
  c. cooling down the obtained extrudate to obtain a solidified extrudate and
  d. breaking the obtained solidified extrudate into smaller particles to obtain the powder coating composition.
and preferably comprising the further step of classifying the thus prepared powder particles via a sieve and collect sieve fraction with particle size below 90 μm.

The powder coating composition of the present invention may optionally contain the usual additives, such as for example fillers/pigments, degassing agents, flow agents, or (light) stabilizers. Examples of flow agents include Byk 361 N. Examples of suitable fillers/pigments include metal oxides, silicates, carbonates or sulphates. Examples of suitable stabilizers include UV stabilizers, such as for example phosphonites, thioethers or HALS (hindered amine light stabilizers). Examples of degassing agents include benzoin and cyclohexane dimethanol bisbenzoate. Other additives, such as additives for improving tribo-chargeability may also be added.

In another aspect, the invention relates to a process for coating a substrate comprising the following steps:
  1) applying a powder coating composition comprising the unsaturated polyester to a substrate such that the substrate is partially or fully coated with a coating.
  2) heating the obtained partially or fully coated substrate for such time and to such temperature such that the coating is at least partially cured.

The powder coating composition of the present invention may be applied using the techniques known to the person skilled in the art, for example using electrostatic spray or electrostatic fluidized bed.

The unsaturated polyester resin composition according to the invention comprises one or more reactive diluents.

The amount of such reactive diluent in the resin composition according to the invention is usually in the range from 5 to 75 wt. %, preferably in the range from 20 to 60 wt. %, most preferably in the range from 30 to 50 wt. % (relative to the total amount of unsaturated polyester and reactive diluent present in the resin composition). The diluent will be applied, for instance, for lowering of the viscosity of the resin composition in order to make handling thereof more easy. For clarity purpose, a reactive diluent is a diluent that is able to copolymerize with the unsaturated polyester resin. Ethylenically unsaturated compounds can be advantageously used as reactive diluent. Preferably, the resin composition comprises styrene, dimethyl itaconate and/or a methacrylate containing compound as reactive diluent. In one embodiment of the invention, styrene, α-methylstyrene, 4-methyl styrene, (meth)acrylates, N-vinylpyrrolidone and/or N-vinylcaprolactam is used as reactive diluent. In this embodiment, styrene and/or (meth)acrylate containing compound is preferably used as reactive diluent and more preferably (meth)acrylate containing compound is used as reactive diluent. In another embodiment, itaconic acid or an ester of itaconic acid is used as reactive diluent. In a more preferred embodiment, the reactive diluent comprises an ester of itaconic acid and at least another ethylenically unsaturated compound, such as for example styrene, α-methylstyrene, 4-methyl styrene, (meth) acrylates, N-vinylpyrrolidone and/or N-vinylcaprolactam. In this embodiment, the resin composition preferably comprises an ester of itaconic acid as reactive diluent and styrene as reactive diluent or a methacrylate containing compound as reactive diluent. A preferred ester of itaconic acid is dimethyl itaconate.

The resin composition preferably further comprises a co-initiator for the radical curing of the resin composition, in an amount of from 0.00001 to 10 wt % (relative to the total amount of unsaturated polyester and reactive diluent present in the resin composition). A preferred co-initiator is an amine or a transition metal compound.

The amine co-initiator that may be present in the composition is preferably an aromatic amine and even more preferably a tertiary aromatic amine. Suitable accelerators include N,N-dimethylaniline, N,N-diethylaniline; toluidines and xylidines such as N,N-diisopropanol-para-toluidine; N,N-dimethyl-p-toluidine; N,N-bis(2-hydroxyethyl)xylidine and -toluidine. The amount of amine in the resin composition (relative to the total amount of unsaturated polyester and reactive diluent present in the resin composition). is generally at least 0.00001 wt. % and preferably at least 0.01 wt. % and more preferably at least 0.1 wt. %. Generally, the amount of amine in the resin composition is at most 10 wt. %, preferably at most 5 wt. %.

Examples of suitable transition metal compounds as co-initiator are compounds of a transition metal with an atomic number of in the range from 22 to 29 or with an atomic number in the range from 38 to 49 or with an atomic number in the range from 57 to 79, such as vanadium, iron, manganese, copper, nickel, molybdenum, tungsten, cobalt, chromium compounds. Preferred transition metals are V, Cu, Co, Mn and Fe.

After having diluted the unsaturated polyester present in the resin composition according to the invention with reactive diluent, additional radical inhibitors may be added. These radical inhibitors are preferably chosen from the group of phenolic compounds, benzoquinones, hydroquinones, catechols, stable radicals and/or phenothiazines. The amount of radical inhibitor that can be added may vary within rather wide ranges, and may be chosen as a first indication of the gel time as is desired to be achieved.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2, 6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), galvinoxyl, aluminium-N-nitrosophenyl hydroxylamine, diethylhydroxylamine, phenothiazine and/or derivatives or combinations of any of these compounds.

Advantageously, the amount of radical inhibitor in the resin composition according to the invention (relative to the total amount of unsaturated polyester and reactive diluent present in the resin composition). is in the range of from 0.0001 to 10% by weight. More preferably, the amount of inhibitor in the resin composition is in the range of from 0.001 to 1% by weight. The skilled man quite easily can assess, in dependence of the type of inhibitor selected, which amount thereof leads to good results according to the invention.

The present invention further relates to a resin composition according to the invention further comprising an initiator for curing the resin composition. The present invention further relates to a multicomponent resin composition comprising a component consisting of resin composition according to the invention and a component comprising an initiator for curing the resin composition. The present invention further relates to a process for radically curing the resin composition according to the invention, wherein the curing is effected by adding an initiator to the resin composition as described above. Preferably, the curing is effected at a temperature in the range of from −20 to +200° C., preferably in the range of from −20 to +100° C., and most preferably in the range of from −10 to +60° C. (so-called cold curing). The initiator is a photoinitiator, a thermal initiator and/or redox initiator.

As meant herein, a photo initiator is capable of initiating curing upon irradiation Photo initiation is understood to be curing using irradiation with light of a suitable wavelength (photo irradiation). This is also referred to as light cure.

A photo-initiating system may consist of a photo initiator as such, or may be a combination of a photo initiator and a sensitizer, or may be a mixture of photo initiators, optionally in combination with one or more sensitizers.

The photo initiating system that can be used in the context of the present invention can be chosen from the large group of photo-initiating systems known to the skilled person. A vast number of suitable photo initiating systems, can be found in, for instance, Volume 3 of "Chemistry and Technology of UV and EB Formulations", $2^{nd}$ Edition, by K. Dietliker and J. V. Crivello (SITA Technology, London; 1998).

The thermal initiator can be selected from azo compounds like for example azo isobutyronitril (AIBN), C—C labile compounds like for example benzopinacole, peroxides, and mixtures thereof. The thermal initiator is preferably an organic peroxide, or a combination of two or more organic peroxides.

The redox initiator is preferably an organic peroxide in combination with at least one of the above mentioned co-initiators. Examples of suitable peroxides are, for instance, hydroperoxides, peroxy carbonates (of the formula —OC(O) OO—), peroxyesters (of the formula —C(O)OO—), diacylperoxides (of the formula —C(O)OOC(O)—), dialkylperoxides (of the formula —OO—), etc.

The present invention further also relates to cured objects or structural parts prepared from unsaturated polyester resin compositions as described above, by curing with an initiator as described above. As used herein, structural resin compositions are capable of providing structural parts. Generally such resin compositions are non-aqueous systems. They contain at most 5% by weight of water, mainly resulting from the reactions during resin preparation. As meant herein, structural parts are considered to have a thickness of at least 0.5 mm and appropriate mechanical properties. End segments where the resin compositions according to the present invention can be applied are for example automotive parts, boats, chemical anchoring, roofing, construction, containers, relining, pipes, tanks, flooring, windmill blades.

The present invention in particular relates to cured objects or structural parts obtained by curing of a resin composition according to the invention with an initiator, preferably comprising a peroxide. According to one embodiment, the curing is preferably effected by moulding, more preferably the curing is effected by compression moulding to obtain in particular a SMC or BMC part. The moulding is preferably effected at a temperature of at least 130° C., more preferably at least 140° C.; and at a temperature of at most 170° C., more preferably of at most 160° C.

The invention is now demonstrated by means of a series of examples and comparative examples. All examples are supportive of the scope of claims. The invention, however, is not restricted to the specific embodiments as shown in the examples.

Standard Resin Synthesis

The diols, diacids and/or anhydrides, optionally inhibitor and catalyst were charged in a reactor equipped with a packed column, a temperature measurement device and inert gas inlet. The mixture was heated slowly by usual methods to 200° C. The mixture in the reactor was kept at 200° C. until the distillation of water stopped. The packed column was removed and the mixture was kept under reduced pressure until the acid value reached a value below 50 mg KOH/g resin. Then the vacuum was relieved with inert gas, and the mixture was cooled down to 130° C. or lower. The solid UP resins were obtained in this way. Next the solid resin was dissolved in a reactive diluent at temperatures below 80° C.

Monitoring of Curing

Curing was monitored by means of standard gel time equipment. This is intended to mean that both the gel time ($T_{gel}$ or $T_{25->35° C.}$) and peak time ($T_{peak}$ or $T_{25->peak}$) were determined by exotherm measurements according to the method of DIN 16945 when curing the resin with the peroxide as indicated.

Mechanical Property Determination

For the determination of mechanical properties 4 mm castings were prepared. After 16 hrs the castings were released from the mould and postcured using 24 hr at 60 C followed by 24 hr at 80 C.

Mechanical properties of the cured objects were determined according to ISO 527-2. The Heat Distortion Temperature (HDT) was measured according to ISO 75-A.

The viscosity was determined at 23° C. using a Physica instrument. The Tg was determined by means of DSC (heating rate 5° C./min), using Mettler-Toledo DSC 821.

Barcoll hardness was determined according to DIN EN59.

Materials

Biobased itaconic acid, obtained from corn, was commercially obtained from Quingdao Langyatai.

Biobased 1,3-propane diol, obtained via a fermentation process from corn, was commercially obtained from DuPont Tate & Lyle.

Biobased isosorbide, obtained from corn, was commercially obtained from Roquette.

Propylene glycol was commercially obtained from BASF.

Maleic anhydride was commercially obtained from DSM Fine Chemicals.

EXAMPLE 1 AND COMPARATIVE EXPERIMENTS A-C

Several resins were prepared via the standard synthesis procedure with the listed ingredients in table 1. The resins were cured using 0.5 wt % of a cobalt solution (NL-49P) followed by 2 wt % Trigonox 44B as peroxide. The curing was monitored with the gel time equipment.

TABLE 1

|  | Example 1 | Comp A UP resin in which part of the propylene glycol is replaced by isosorbide | Comp B UP resin based on itaconic acid | Comp C |
| --- | --- | --- | --- | --- |
| Itaconic acid (g) | 429.3 |  | 429.3 |  |
| Maleic anhydride (g) |  | 323.6 |  | 323.6 |
| Phtalic anhydride(g) | 992.4 | 992.4 | 992.4 | 992.4 |
| 1,2-propylene glycol(g) | 718.0 | 718.0 | 844.5 | 844.5 |
| Isosorbide(g) | 243.2 | 243.2 |  |  |
| Acid value neat resin (mg KOH/g resin) | 44 | 44 | 43 | 44 |
| Hydroxy value neat resin (mg KOH/g resin) | 101 | 102 | 104 | 106 |
| Molar ratio of hydroxyl end groups and carboxylic acid end groups | 2.3 | 2.32 | 2.42 | 2.41 |
| Tg of polycondensate (° C.) | 8.0 | 18.0 | 2.0 | — |
| Reactive diluent | Styrene | Styrene | Styrene | Styrene |
| Solid content | 65% | 65% | 65% | 65% |
| Viscosity @23° C. (mPa · s) | 613 | 1531 | 450 | 610 |
| Gel time (min) | 25 | 10 | 17 | 19 |
| Peak time (min) | 41 | 18 | 64 | 26 |
| Peak Temperature (° C.) | 130 | 142 | 73 | 145 |
| Tensile strength (MPa) | 75 | 64 | 60 | 70 |
| Tensile modulus (GPa) | 4.2 | 4.2 | 3.2 | 4.0 |
| Elongation at break (%) | 1.9 | 1.58 | 2.3 | 2 |
| Flexural strength (MPa) | 111 | 103 | 90 | 110 |
| Flexural modulus (GPa) | 4.3 | 4.7 | 2.8 | 4.1 |

TABLE 1-continued

|  | Example 1 | Comp A UP resin in which part of the propylene glycol is replaced by isosorbide | Comp B UP resin based on itaconic acid | Comp C |
|---|---|---|---|---|
| Barcol Hardness | 42 | 48 | 38 | 57 |
| HDT (° C.) | 70 | 61 | 45 | 54 |

The example combined with the comparative experiment clearly demonstrates the unexpected synergistic effect of using both itaconic acid as well as isosorbide in unsaturated polyester resins. Only by using the combination the thermal stability as determined with the HDT can be increased, whilst maintaining or even increasing the other mechanical properties without affecting the resin viscosity when compared to the commercial reference. This is remarkable as by only using itaconic acid both the viscosity as well as many of the mechanical properties decreased, whilst applying only the isosorbide the viscosity dramatically increased whilst the mechanical properties remained similar. Consequently an unexpected synergistic effect causes this favorable combination of properties.

EXAMPLE 2

A resin was prepared using the standard synthesis procedure using 429.3 g itaconic acid, 117.4 g 1,2-propylene glycol, 117.4 g 1,3-propanediol and 79.6 g isosorbide. After dilution in styrene to a solid content of 65% the resin was cured using 0.5 wt % of a cobalt solution (NL-49P) followed by 2 wt % Trigonox 44B as peroxide. The curing was monitored with the gel time equipment. The resulting cure characteristics are: a gel time of 32 min, a peak time of 40 min and a peak exotherm of 153° C.

This example clearly shows that according to the invention also other diols can be employed in combination with isosorbide and itaconic acid.

EXAMPLE 3-6

Several resins were prepared via the standard synthesis procedure with the listed ingredients in table 1. The resins were cured using 0.5 wt % of a cobalt solution (NL-49P) followed by 1.5 wt % Trigonox 44B as peroxide. The curing was monitored with the gel time equipment.

TABLE 2

|  | Example 3 | Example 4 | Example 5 | Example 6 |
|---|---|---|---|---|
| Itaconic acid (g) | 582 | 593 | 567 | 484 |
| Maleic anhydride (g) |  |  |  | 101 |
| 1,2-propylene glycol (g) | 317 | 342 | 282 | 330 |
| Isosorbide (g) | 101 | 65 | 151 | 85 |
| Acid value neat resin (mg KOH/g resin) | 44 | 43 | 49 | 56 |
| Hydroxy value neat resin (mg KOH/g resin) | 94 | 94 | 99 | 78 |
| Molar ratio of hydroxyl end groups and carboxylic acid end groups | 2.14 | 2.19 | 2.02 | 1.39 |
| Tg of polycondensate (° C.) | −8.0 | −12.0 | −5.0 | −5.0 |
| Reactive diluent | styrene | Styrene | styrene | Styrene |
| Solid content (%) | 63 | 64 | 65 | 64 |
| Viscosity @23° C. (mPa · s) | 1140 | 1250 | 1140 | 1475 |
| Gel time (min) | 19 | 28 | 34 | 14 |
| Peak time (min) | 29 | 37 | 43 | 20 |
| Temperature (° C.) | 146 | 157 | 133 | 161 |
| Tensile strength (MPa) | 77 | 72 | 57 | 70 |
| Tensile modulus (GPa) | 3.5 | 3.5 | 3.7 | 3.5 |
| Elongation at break (%) | 3.1 | 2.9 | 1.7 | 2.3 |
| Flexural strength (MPa) | 124 | 121 | 109 | 86 |
| Flexural modulus (GPa) | 3.5 | 3.5 | 3.7 | 3.6 |
| Barcol Hardness | 45 | 45 | 43 | 52 |
| HDT (° C.) | 98 | 95 | 91 | 104 |

These experiments show that various amount of isosorbide can be used according to the invention. Furthermore these examples also demonstrate that itaconic acid can be used in combination with other unsaturated diacids and or anhydrides like for instance maleic anhydride.

EXAMPLES 7 AND 8

A resin prepared according to the synthesis procedure of example 5 was diluted with a mixture of styrene and dimethyl itaconate (25/10 ratio) and with butanediol dimethacrylate respectively. The cure results using 0.5 wt % Co solutions (NL-49P) and 2 wt % Trigonox 44B were as follows:

Sty/DMI mixture: gel time=20 min, peak time 31 min and peak temperature 132°.

BDDMA: gel time=40 min, peak time 60 min and peak temperature 90° C.

These examples demonstrate that various reactive diluents can be used in combination with the resins according to the invention. Furthermore the dilution with methacrylates also shows that styrene free resin compositions can be prepared according to the invention.

EXAMPLE 9

A resin was prepared using the standard synthesis procedure using 429.3 g itaconic acid, 234.8 g 1,3-propanediol and 79.6 g isosorbide. After dilution in styrene to a solid content of 65% the resin was cured using 0.5 wt % of a cobalt solution (NL-49P) followed by 2 wt % Trigonox 44B as peroxide. The curing was monitored with the gel time equipment. The resulting cure characteristics are: a gel time of 292 min, a peak time of 305 min and a peak exotherm of 135° C.

This example clearly shows that according to the invention also unsaturated polyester which can be completely based on bio-renewable materials can be prepared.

The invention claimed is:
1. A resin composition comprising:
 (a) an unsaturated polyester resin having a molecular weight $M_n$ of at least 750 Dalton and at most 5000 Dalton, and

(b) a reactive diluent, wherein
the unsaturated polyester resin comprises C5-C10 unsaturated diacid building blocks and isosorbide building blocks, and wherein
at least 25 wt. % of the unsaturated dicarboxylic acid building blocks of the unsaturated polyester resin are itaconic acid building blocks.

2. The resin composition according to claim 1, wherein at least part of the isosorbide is derived from a non-fossil source.

3. The resin composition according to claim 1, wherein the C5-C10 unsaturated dicarboxylic acid building blocks are itaconic acid or anhydride building blocks.

4. The resin composition according to claim 3, wherein at least a part of the itaconic acid or anhydride building blocks is derived from a non-fossil source.

5. The resin composition according to claim 1, wherein the isosorbide building blocks are present in a molar amount of at least 2.5% and at most 50%, relative to the total amount of diols.

6. The resin composition according according to claim 1, wherein the unsaturated polyester resin has a Tg which is at least −70° C. and at most 100° C.

7. The resin composition according to claim 1, wherein hydroxyl end groups and carboxylic acid end groups in the unsaturated polyester resin are present in a molar ratio of the hydroxyl end groups to the carboxylic acid end groups in a range from 0.33 to 3.

8. The resin composition according to claim 7, wherein the molar ratio of hydroxyl end groups and carboxylic acid end groups in the unsaturated polyester resin is in the range from 1.1 to 3.

9. The resin composition according to claim 1, wherein the reactive diluent comprises styrene, dimethyl itaconate and/or a methacrylate.

10. The resin composition according to claim 1, wherein the resin composition further comprises an initiator for curing the resin composition.

11. A multicomponent resin composition comprising a component consisting of the resin composition according to claim 1, and a component comprising an initiator for curing the resin composition.

12. A cured object or structural part obtained by curing a resin composition according to claim 1 with an initiator.

13. A powder coating composition comprising a resin composition according to claim 1.

* * * * *